(12) United States Patent
Lares et al.

(10) Patent No.: US 7,880,080 B2
(45) Date of Patent: Feb. 1, 2011

(54) JUNCTION BOX FOR OUTPUT WIRING FROM SOLAR MODULE AND METHOD OF INSTALLING SAME

(75) Inventors: Joseph G. Lares, Barnegat, NJ (US); Dinesh S. Amin, Clarksburg, MD (US)

(73) Assignee: BP Corporation North America Inc., Warrenville, IL (US)

( * ) Notice: Subject to any disclaimer, the term of this patent is extended or adjusted under 35 U.S.C. 154(b) by 1304 days.

(21) Appl. No.: 11/349,839

(22) Filed: Feb. 8, 2006

(65) Prior Publication Data

US 2006/0180196 A1   Aug. 17, 2006

Related U.S. Application Data

(60) Provisional application No. 60/652,256, filed on Feb. 11, 2005.

(51) Int. Cl.
*H01J 5/00* (2006.01)
*H01L 25/00* (2006.01)

(52) U.S. Cl. .......................................... 136/243; 174/50

(58) Field of Classification Search ....................... None
See application file for complete search history.

(56) References Cited

U.S. PATENT DOCUMENTS 3,139,314 A * 6/1964 Miller .......................... 439/436
4,818,822 A * 4/1989 Yahraus ........................ 174/53
6,462,265 B1 10/2002 Sasaoka et al.

FOREIGN PATENT DOCUMENTS

EP             0 867 947 A2     9/1998
WO          WO 00/30216         5/2000

* cited by examiner

*Primary Examiner*—Alexa D Neckel
*Assistant Examiner*—Miriam Berdichevsky
(74) *Attorney, Agent, or Firm*—Thomas E. Nemo

(57) ABSTRACT

A junction box adapted to protect soldered electrical connections between outputs and cables wherein the connections are on a flat surface (e.g. the backing sheet of a solar module) and a method for installing the box over the connections. The junction box can have a split housing that can be spread to fit over the cables before filling the housing with a sealant which, in turn, covers and protects the connections. A separate cover is then latched onto the housing.

14 Claims, 3 Drawing Sheets

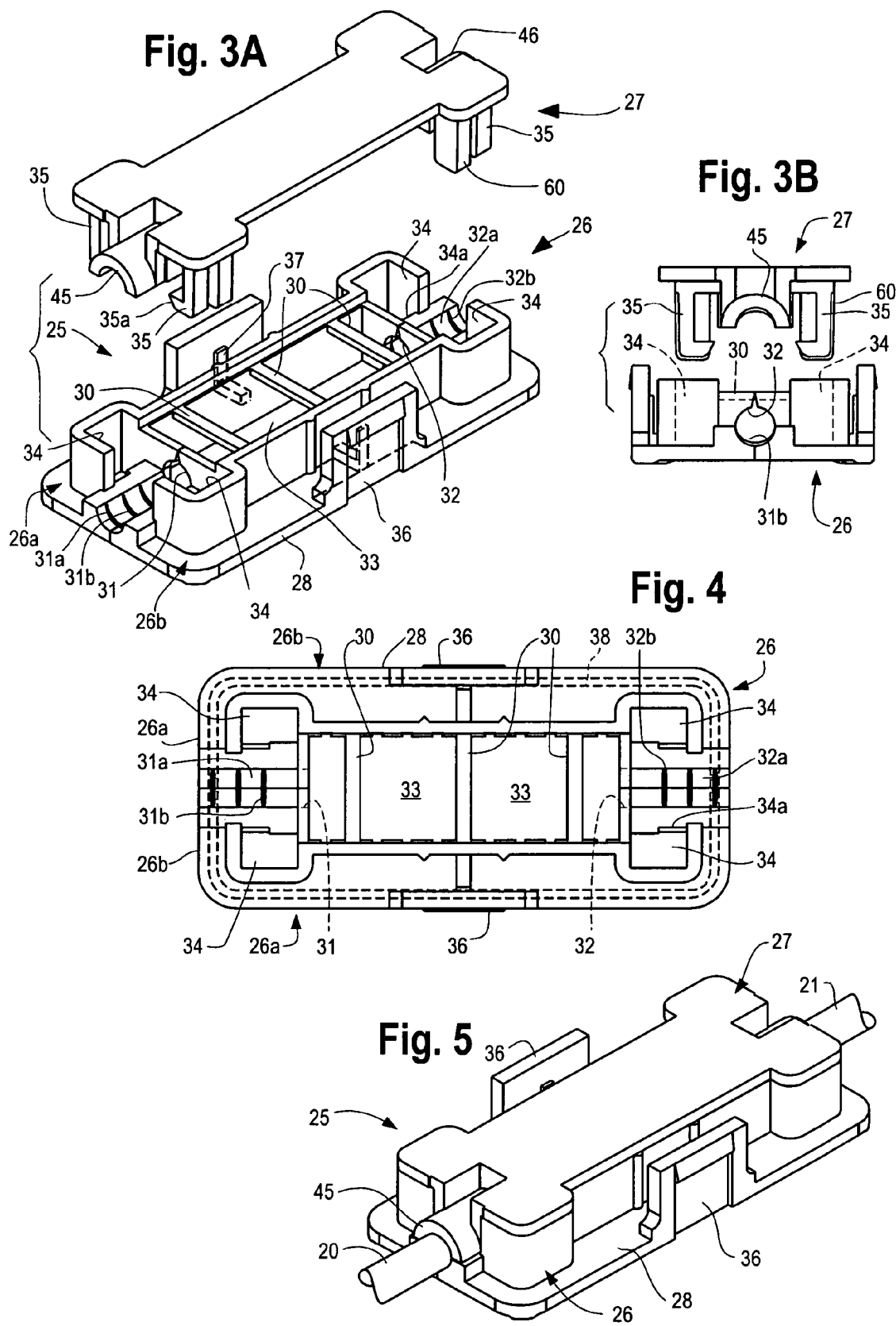

JUNCTION BOX FOR OUTPUT WIRING FROM SOLAR MODULE AND METHOD OF INSTALLING SAME

This application claims the benefit of U.S. Provisional Patent Application 60/652,256, filed on Feb. 11, 2005.

FIELD OF THE INVENTION

The present invention relates to a junction box for protecting electrical connections from the elements and in one of its aspects relates to a junction box adapted to be positioned over and protect the connections between the terminal output wires of a solar module and their respective output cables and a method of installing the junction box over these connections.

BACKGROUND OF THE INVENTION

In recent years, considerable advances have been made in photovoltaic (PV) cells or the like for directly converting solar energy into useful electrical energy. Typically, a plurality of these photovoltaic cells are encased between a transparent sheet (e.g. glass, plastic, etc.) and a sheet of backing material, to thereby form a flat, typically rectangular-shaped solar module (sometimes also called "laminate" or "panel") of a manageable size (e.g. 1 meter by 2 meters). The PV cells may be made from wafers of silicon or other suitable semiconductor material, or they can be a thin film type of cell typically deposited on the substrate or backing sheet by various processes well known in the solar module art. This is the type of solar module that can be installed onto the roof of an existing structure (e.g. a house, building, or the like) to provide all or at least a portion of the electrical energy used by that structure.

Each solar module may contain any number of individual PV cells (e.g. from 1 to about 100), each of which has a positive and a negative output which, in turn, are electrically connected in series to a common positive and negative bus bar or output wire, respectively, to produce the desired voltage from the module as will be understood in the art. The terminals of the positive and negative outputs typically pass through the backing material near one end of the module. The respective outputs can pass directly through the backing material or as is more likely, will be connected through a PC board within the solar module (e.g. a PC board having components which allow the module to continue to function when one or more individual PV cell becomes inoperable for any reason).

Once the positive and negative outputs are soldered onto the outside of a module, they must then be connected to respective positive and negative output cables which, in turn, convey the electric current from the module so the current can be used for its intended purpose. Typically, one end of each of the cables is soldered to an output terminal on the modules. A problem arises in protecting the soldered connections between the terminals and the output cables in that, if left exposed, can short out or otherwise be damaged by adverse weather or atmospheric conditions.

To protect these connections against the "elements", a protective structure, commonly called a "junction box", is positioned and secured over the connections and the box is filled with an epoxy to cover the connections. While previously known junction boxes have functioned well for this purpose, they have some drawbacks. For example, the epoxy is filled into the box through a small hole therein after the box has been positioned over the connections. This almost always allows small amounts of air to be trapped inside the box during the filling operation. This trapped air, in turn, can allow moisture and/or water to enter the box and attack the integrity of the connections which, in turn, can render the module inoperable.

Further, the prior art boxes are relatively large in size and require large amounts of epoxy to cover the connections. Also, due to their construction and installation of these boxes, it is not unusual for the epoxy to run out from the lower edge of the box and adversely affect the esthetic quality of the finished product. Still further, the prior boxes are relatively difficult and time consuming to assemble thereby adding to the capital costs for such solar module systems. Since solar module systems are highly competitive with other sources of electricity, any savings in the costs involved can make a solar module system more attractive to potential users. Accordingly, it can be seen that a junction box which can quickly and easily be assembled over the output connections of a solar module, use less epoxy for installation, and present a clean profile once installed would be highly beneficial in the manufacture and marketing of solar modules. The present invention provides such junction box.

SUMMARY OF THE INVENTION

The present invention provides a junction box adapted to protect electrical connections from the "elements" wherein the connections are between outputs and respective cables and are made on a substantially flat surface. The invention is also a method for installing the junction box over the connections. The junction box of the present invention is easy to install after one or more output cables have been soldered to one or more outputs of a solar module or the like. Further, since only a portion of the box is filled with the protective sealant, which protects the connection or connections, lesser amounts of this sealant is needed thereby reducing the overall manufacturing costs for solar modules of this type. Also, the manner in which the box is secured in place substantially improves the esthetics of the finished product.

More specifically, the junction box of the present invention is comprised of a housing and a cover, preferably a cover that is a piece that is separate from the housing. The housing has an inner chamber which is adapted to be positioned over the electrical connection and which is to be filled with a protective sealant to encase the connection or connections. The housing also has one or more passages therein which extend from the inner chamber to the outside of the housing. Each of these passages is adapted to receive a cable from a respective connection when the box is installed. The cover is latched onto the housing to close the chamber after the chamber has been filled with the protecting sealant.

To allow easy installation, the housing of the present junction box is "split", that is, the box is comprised of two mirrored halves or sections, each section having a bottomless, recessed central portion therein which forms approximately half of the inner chamber and two separate semi-passages, each of which form approximately half of the respective passages for the cables. Preferably, the two sections are connected together by, for example, at least one hinge means, such as a flexible strap, that acts as a hinge to allow the sections to move away from each other to thereby spread and open said passages to allow each passage to be easily positioned over a cable of the connection. Preferably, the two sections and the strap or straps are molded together so they are formed as an integral unit. Preferably, a tab is attached to the base of each section and extends upward therefrom to aid in moving said sections relative to each other during installation.

In operation, the present junction box is easily installed over, for example, two electrical connections between two electrical outputs, which terminate on a relatively flat surface, and two output cables, respectively, such as the soldered connections which exist on the backing sheets of typical solar modules. To install the present junction box, an adhesive sealant is preferably applied to the base of the housing of the box, preferably in a groove on the underside of such base. The housing is then positioned onto the flat surface (e.g. backing sheet) so that the inner chamber of the housing is positioned over the connections and the cables are received within their respective passages. To do this, the tabs on the respective sections are pressed towards each other to move the sections relative to each other which, in turn, spreads and opens the passages so that they can easily be fitted around the cables.

The base of the housing is then pressed down onto the flat surface to bring the adhesive sealant, if present, into contact with the flat surface to secure the box onto the flat surface. The inner chamber in the housing is filled with a protective sealant to cover and encase the connections after which the cover is latched onto the housing to close the now-filled inner chamber. Preferably, the cover is latched onto the housing before the protective sealant is fully set.

BRIEF DESCRIPTION OF THE DRAWINGS

The actual construction operation, and apparent advantages of the present invention will be better understood by referring to the drawings, not necessarily to scale, in which like numerals identify like parts and in which:

FIG. 3A is a perspective, exploded view of one embodiment of the junction box of the present invention and FIG. 3B is an end view of the junction box shown in FIG. 3A;

FIG. 4 is a top view of the housing of the junction box of FIG. 3A;

FIG. 5 is a perspective view of the junction box of FIG. 3 when assembled; and

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DETAILED DESCRIPTION OF THE INVENTION

Figure 1:
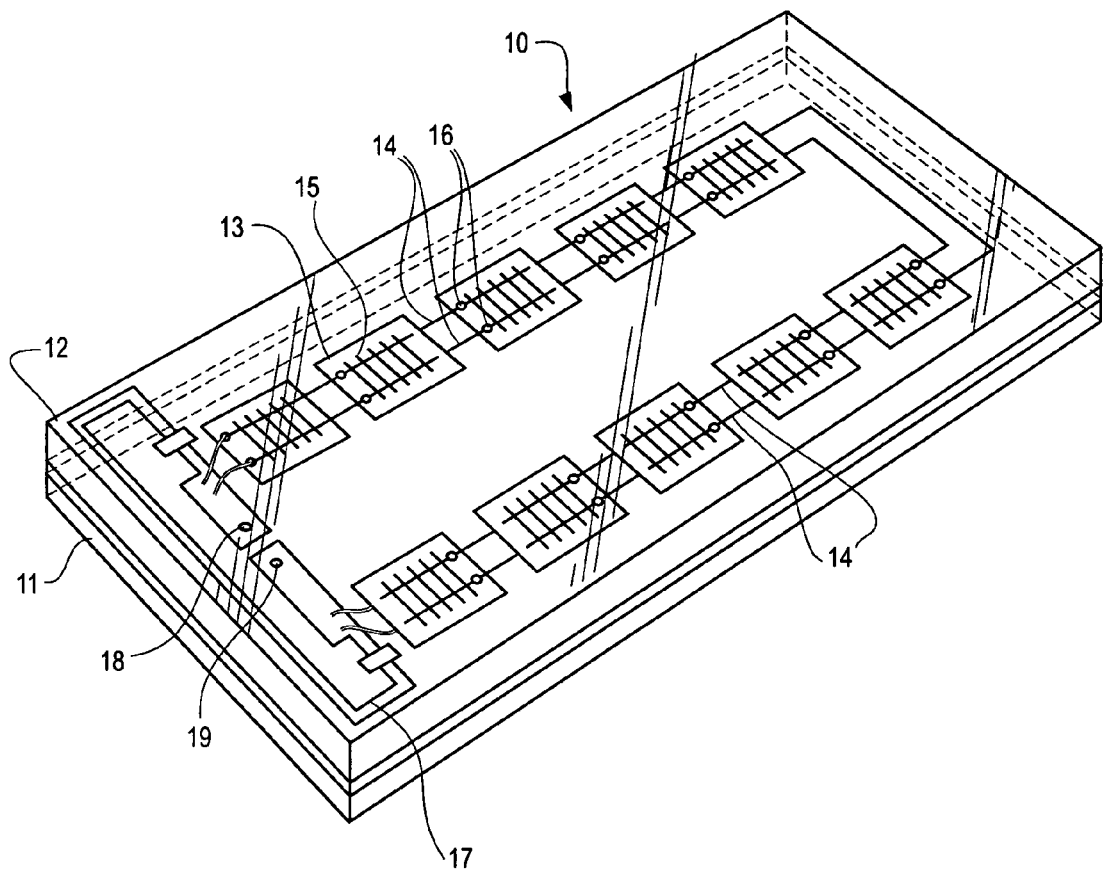
FIG. 1 is a perspective view of a photovoltaic module of a type in which the present invention can be incorporated.

Referring now to drawings, FIG. 1 illustrates a typical photovoltaic module 10 in which the junction box of the present invention can be used. Module 10 is formed of a backing sheet 11 of any suitable material, e.g. a polymeric material, and a cover substrate 12, preferably comprised of glass or other suitable transparent material. Between substrate 12 and backing sheet 11 is sandwiched a plurality of photovoltaic cells (PV) 13 (only one numbered for clarity), electrically connected in series by wires 14. The PV cells may be of any type such as those made from multi-crystalline or mono-crystalline silicon wafers. As shown, each cell 13 has a grid-type, front electrical contact 15 (only one numbered for clarity)

Figure 2:
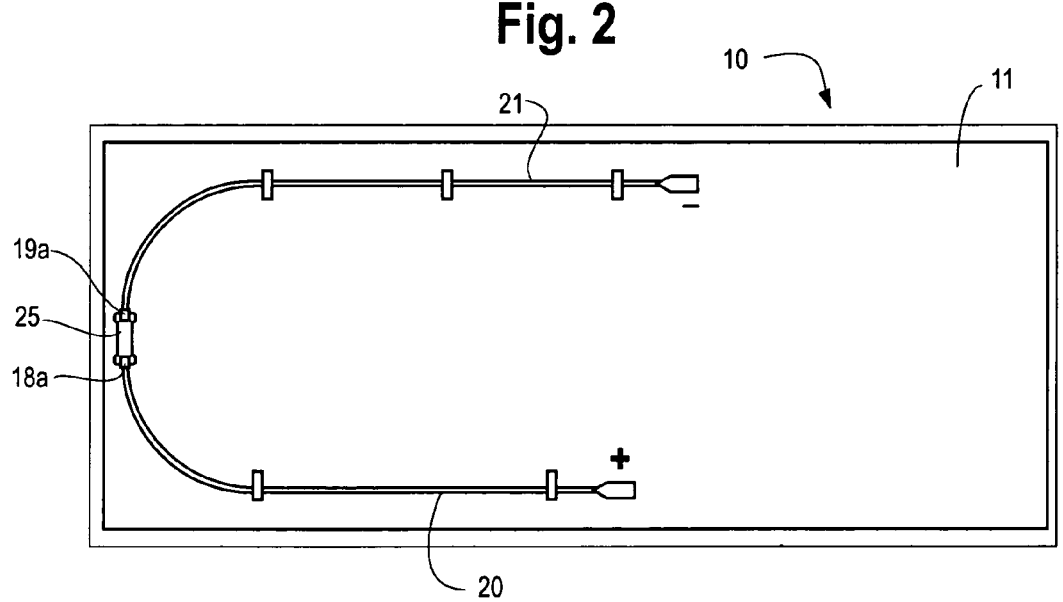
FIG. 2 is a view of the underside of the module of FIG. 1.

Sunlight enters through substrate sheet 12 and impinges on the front side of the PV cells 13. The wires 14, which connect the cells 13 in series, are connected to a contact on the back side of the cells (not shown) and to the solder contact points 16 on the front side of PV cells 13 to couple cells in series. Wires 14 are connected to a PC board 17 which, in turn, controls certain functions relating to the operation of module 10. Since neither the PC board 17 nor any functions controlled thereby form any part of the present invention, no further description is deemed necessary for a full understanding of the present invention. Wires 14 effectively terminate on PC board 17 at a solder point 18 (positive output) and a solder point 19 (negative output), both of which effectively extend through the backing sheet 11 as shown in FIGS. 1 and 2 to provide the outputs for the module.

To utilize the electrical energy generated by solar module 10, positive output cable 20 and negative output cable 21 are soldered or otherwise electrically connected to solder points 18, 19, respectively, on outside of backing sheet 11 thereby forming electrical connections 18a and 19a, respectively. Once the cables are connected to the outlets, it is desirable to protect these connections from the "elements" during the operational life of module 10. In accordance with the present invention, junction box 25 is positioned over both of the connections 18a, 19a and is secured thereon by an adhesive material, as will be described in detail below.

As best seen in FIGS. 3-5, junction box 25 comprises a housing 26 and a cover 27. Both the housing and cover of box 25 may each be comprised of a variety of suitable materials and can be formed in any suitable manner. Preferably the housing and cover are made by injection molding. Preferably, the housing and cover are made of a plastic or resin material. It is preferable that the cover and box be made of the same material. The box and cover can be made of a nylon, a polycarbonate, a polypropylene oxide, or other suitable plastic or resin material. The plastic or resin can be filled with one or more materials such as wood, glass, paper and the like. Norel 190X, Norel 225X and Norel 300X are suitable materials for making the junction box of this invention. It is preferable that the material used to make the box and cover be fire retardant and electrically non-conductive. Preferably, the housing and cover are separate parts as shown in the Figures. Housing 26 has a base, preferably an elongated base, 28, the bottom of which is adapted to rest substantially flat on backing sheet 11 when box 25 is in its operable position over the connections. Housing 26 is preferably formed of two mirrored halves or sections 26a, 26b which are preferably held together in a hinged relationship by a flexible coupling means, e.g. one or more flexible straps 30 (three shown in FIGS. 4 and 5) for a purpose described below.

The straps 30 are preferably of the same material as that of the housing and are preferably molded integral therewith and so that housing 26 can be molded in one operation as a single unit. Straps 30 are sized to be flexible without breaking to act as a "hinge" whereby the sections of the housing can be moved away from each other to allow the housing to be placed over and receive the output cables during installation of the box as will explained in detail below.

The sections 26a, 26b preferably have semi-circular recesses in each end thereof which cooperate with each other to form openings 31, 32, respectively, at either end of the housing when the housing is in its normal position. Each of these openings open into a bottomless chamber 33 formed by the respective recessed portions in the two sections. The openings 31, 32 are adapted to receive the output cables 21, 20, respectively, when housing 26 is placed over the connections. A semi-trough is formed in each section adjacent the semi-circular recesses which form openings 31, 32, respectively, and each semi-trough has at least one gripping rib or the like 31b, 32b, respectively, formed therein, for a purpose described below. When housing 26 is in its normal position, the semi-troughs cooperate with each other to form troughs 31a, 32a, respectively, for a purpose described below.

Further, each section 26a, 26b has a hollow recess 34 positioned at each end thereof which has a latch surface 34a or the like (only one numbered for clarity in FIGS. 3A and 4) near the bottom thereof. Recesses 34 act as latch receivers which, in turn, are adapted to receive the depending latch elements 35 on cover 27 (see FIG. 1) for latching the cover to the housing when the box is assembled. Each latch element 35 has at least one tapered detent 35a (only one numbered in FIG. 3A) on the lower end thereof which, in turn, is cammed outward when it contacts its respective latch surface 34a and then snaps back to its original position after it clears surface 34a to thereby latch the cover onto the housing. Outer edge of latch surface 34a can be beveled or partly beveled to facilitate the passing of tapered detent 35a over the edge of latch surface 34a when the tapered detent makes contact with the latch surface.

Figure 6A:
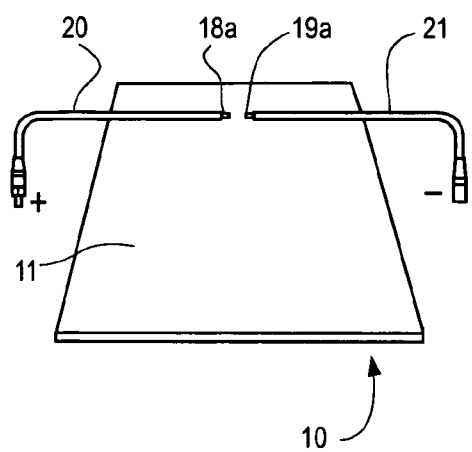
FIGS. 6A-6F illustrate the steps in assembling the junction box of FIG. 3A into its operable position.
Figure 6B:
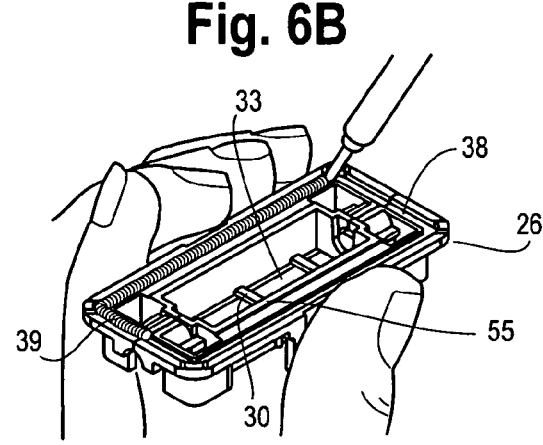
Figure 6C:
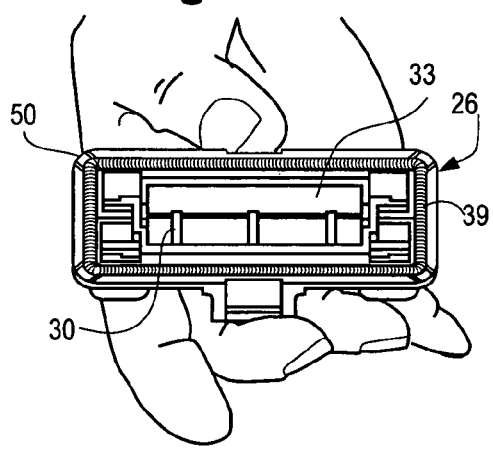
Figure 6D:
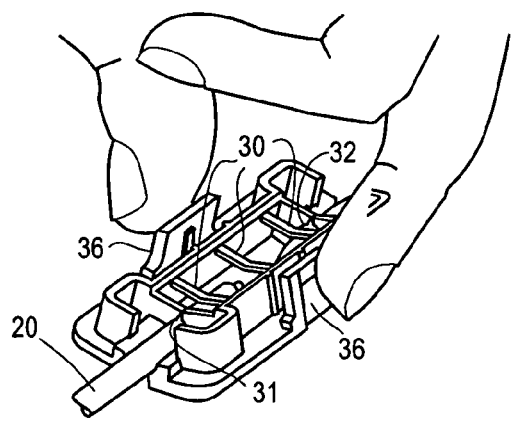
Figure 6E:
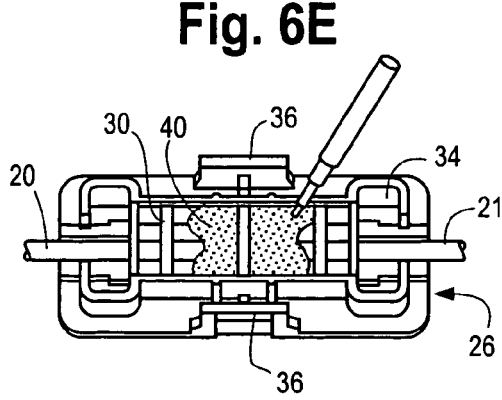
Figure 6F:
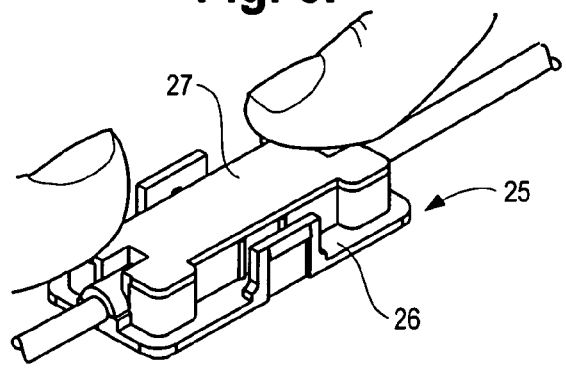

Each section 26a, 26b has a "pinch" tab 36 formed integral on the base thereof approximately at the midpoint between the ends of the section to aid in rotating the sections about the "hinge" provided by straps 30 to thereby spread and open the passages 31, 32 (see FIG. 6D). This allows housing 26 to be easily fitted over the output cables. Rib element 37, only one numbered for clarity, helps reinforce tab 36 and, as described in more detail below, helps support cables placed between tab 36 and housing 26. Each section also has a groove 38 (see dotted lines in FIG. 4 and FIGS. 6B and 6C) in the bottom thereof which extends around the periphery of base 28 for the purpose described below. Although not shown in the figures, groove 38 can have a textured surface to improve adhesion of an adhesive that is used, as described in more detail below, to attach the junction box to a solar module.

As shown in FIG. 6C, the corners of the underside surface of base 28 can have slightly raised bumps or pads 50 (only one pad numbered for clarity) to assist with placing the junction box on a surface such as a solar module back sheet that may be somewhat uneven. As shown in FIG. 6B the perimeter of bottom edge of chamber 33 can have a raised perimeter 55 to form a close fit with the surface of the module when the junction box is placed on the module. Such a close fit reduces the likelihood of sealant leaking past the chamber and onto the module surface. As shown in FIG. 3A, cover 27 can include guide pins 60 (only one numbered for clarity) in each corner of the cover positioned next to latch elements 35. Guide pins 60 act to prevent the halves 26a and 26b from opening when cover 27 is placed into housing 26. Cover 27 can also include a downward facing ridge that is adapted to fit against the inside surface of chamber 33 when cover 27 is placed in position on housing 26. The ridge functions as a dam to inhibit sealant from leaking between the housing and cover.

Now that the construction of junction box 25 has now been described, the method of how it is assembled over the electrical connections 19a, 20a follows. FIGS. 6A-6F clearly illustrate preferred steps for assembling junction box 25 into its operable position. As shown in FIG. 6A, output cables 20, 21 are soldered or otherwise electrically secured to the outputs from solar module 10 on the underside of solar module 10 as described above. Junction box 25 is inverted (FIG. 6B) and groove 38 on the underside of base 28 is filled with an adhesive sealant 39. The adhesive sealant can be any suitable adhesive sealant such as a silicone sealant available from suppliers such as General Electric Company or Dow Corning. The adhesive sealant can also be a hot melt adhesive, an epoxy or a two-sided tape. Preferably, the adhesive sealant is of a viscosity that does not readily run out of the groove and onto the surface of the solar module when the box is applied to the surface of the module. It is also preferable that the sealant be flame retardant. Suitable adhesive sealants include materials such as Dow Corning 732 or 732, or General Electric RTV 108. A contiguous bead of sealant should be applied as shown in FIG. 6C.

Tabs 36 are pressed or pinched inward to rotate sections 26a, 26b, about the hinge means provided by the flexible straps 30 (FIG. 6D) until the openings 31, 32 open sufficiently to be positioned around the output cables 20, 21, respectively, and allow the cables to lie within their respective troughs 31b, 32b when the housing is returned to its original position upon the release of the pressure on tabs 36. This entraps the cables within their respective openings 31, 32 and positions them within troughs 31a, 32a. The housing is then pressed downward onto the backing material 11 of the solar module so that adhesive 39 will set to adhere box 25 to the module.

Next, chamber 33 is filled with a suitable protective sealant 40 but only until the sealant reaches the bottom of all of the straps 30 and is substantially level within the chamber. The protective sealant can be any suitable material that fills the chamber and protects the connections. For example, it can be an epoxy or a two-part silicone. The sealant should be self-leveling, flame-retardant, have good flow characteristics, and be quick setting. Suitable epoxy materials are available from suppliers such as Loctite, 3M, Aremco, Devcon, Botik and Emerson & Cuming. Suitable two-part silicone adhesives are available from suppliers such as Dow Corning and Columbus Adhesive & Chemical Company. Suitable sealants include 3M DP-100, Dow Corning RTV 3140 or General Electric TSE 3664. At this point, the sealant will cover the connections 18a, 19a and protect them from the elements. Care should be taken not to get sealant in the latch receivers 34 at the corners of housing 26. As shown in FIG. 4, the inside wall of chamber 33 can have one or more spaced ribs that run vertically, preferably from top to bottom, of the chamber 33. These ribs can help the adhesion of the sealant to the junction box. The latch elements 35 on cover 27 are then positioned into their respective hollow latch receivers 34 on housing 26 and while the sealant is still unset, the cover is pressed downward until a "click" is heard at all four corners of the housing. This indicates that the cover has been properly latched in position on the housing. At this point, there should be no gap between the cover and the housing.

As the cover moves downward onto the housing, the troughs 45, 46 that are formed integral on cover 27 cooperate with the troughs 31a, 32a, respectively to form circular passages which, in turn, encircle a significant portion of cables 20, 21, respectively. Ribs 31b, 32b and ribs (not shown) in troughs 45, 46 cooperate to grip the respective cables and hold then securely in place as the respective troughs are moved towards each other. This gripping effect provides additional security in preventing the cables from inadvertently being pulled or yanked hard enough during handling and/or installation to break its electrical connection within the box.

It can be seen from the above that the junction box of the present invention is easy to install after the output cables have been soldered to the outputs of a solar module. Further, since only chamber 33 needs be filled with protective sealant, lesser amounts of sealant is needed than with prior boxes thereby providing savings in manufacturing costs. Also, the chamber is filled before the cover is attached which prevents air from being trapped therein. Still further, since the adhesive 39 can be carefully metered into groove 38 on the base of the housing and since the box is adhered to the backing during filling of chamber 33, there will be little, if any, flow of either adhesive or protective sealant from the lower end of the box during installation, thereby substantially improving the esthetics of the finished product.

Pinch tabs 36 can be spaced from the adjacent outer wall of chamber 33 to accommodate and hold a cable, such as an electrical cable exiting the junction box in the finished module. Such cable can be held during, for example, storage and shipping of the module, and after the module is installed on a roof or other structure. The inside of pinch tab 36 as well as the part of adjacent outer wall of chamber 33, can have one or more ribs shaped to hold or grab a cable, particularly a cable encased in a rubber or other pliant and insulating material.

U.S. Provisional Patent Application 60/652,256, filed on Feb. 11, 2005, is incorporated herein by reference in its entirety.

What is claimed is:

1. A junction box adapted to protect an electrical connection formed between an output and a respective cable wherein said connection is made on a substantially flat surface, said junction box comprising:
    a split housing having a bottomless inner chamber adapted to be positioned over at least one electrical connection and adapted to be filled with a protective sealant;
    said housing having at least one opening therein extending from said inner chamber to the outside of said housing; and
    a cover adapted to be latched onto said housing to close said chamber when said chamber is in an operable position over said connection.

2. The junction box of claim 1 wherein said split housing comprises:
    two mirrored sections,
    means for securing said sections together to allow said sections to move away from each other to thereby position said openings around one or more cables.

3. The junction box of claim 2 comprising two said openings wherein each section has a recessed central portion therein which forms approximately half of said inner chamber and two separate semi-recesses, each forming approximately half of said openings, respectively, when said housing is in its operable position.

4. The junction box of claim 3 wherein said means for securing said sections together comprises:
    at least one flexible strap extending between said sections and attached thereto.

5. The junction box of claim 4 wherein at least one said strap is formed integral with said two sections.

6. The junction box of claim 5 wherein said housing includes:
    latch receiver means on said housing:
    and wherein said cover includes:
    latch elements adapted to be received by said latch receiver means on said housing for latching said cover to said housing.

7. The junction box of claim 1 wherein said electrical connections is a solder joint between an output from a solar module and said cable.

8. A junction box adapted to protect electrical connections between two outputs and two respective cables wherein said connections are made on a substantially flat surface, said junction box comprising:
    an elongated housing comprising
    two mirrored halves, each half comprising
    an elongated section having a base and a bottomless, recessed central portion therein which forms substantially half of a bottomless inner chamber within said housing when said two halves are assembled together, said chamber adapted to be filled with a protective sealant; each half also having a semi-recess at each end thereof which forms substantially half of a respective opening which extends from said inner chamber to the outside of said housing when said two halves are assembled together; each of said openings being adaptable for receiving one of said cables;
    said base on each half has a groove on the bottom thereof which extends around the periphery thereof, said groove adapted to be filled with an adhesive sealant to thereby secure said housing in place over said connections; and
    means for securing said two mirrored halves together whereby said halves can be moved relative to each other to thereby allow said passages to spread and open to receive said cables; and
    a cover adapted to be latched onto said housing to close said inner chamber in said housing when said inner chamber is in an operable position over said connections and is filled with said protective sealant.

9. The junction box of claim 8 wherein said means for securing said halves together comprises:
    at least one flexible strap extending over the top of said inner chamber and between said halves and attached thereto.

10. The junction box of claim 9 where said at least one strap is formed integral with said two halves.

11. The junction box of claim 10 wherein said housing has a semi-trough formed adjacent each of said semi-recesses, respectively, in said housing whereby two cooperating said semi-troughs will form a trough adjacent one of said openings, respectively, when said housing is in its normal position; each said trough adapted to receive one of said cables; and
    wherein said cover includes a trough near each end thereof which cooperates with one of said troughs in said housing to encircle said cables when said cover is in place on said housing.

12. The junction box of claim 9 including:
    a tab attached to said base of each section and extending upward therefrom for aiding in moving said halves relative to each other.

13. The junction box of claim 8 wherein said junction box is comprised of an injection molded plastic.

14. The junction box of claim 9 wherein said two halves and said at least one strap are comprised of an injection molded plastic and are formed in a single operation whereby said at least one strap connects said two halves and is integral therewith.

* * * * *